United States Patent
Khan et al.

(10) Patent No.: US 10,263,684 B2
(45) Date of Patent: Apr. 16, 2019

(54) WIRELESS SYSTEM USING DIFFERENT BANDS IN THE TRANSMIT AND RECEIVE DIRECTION AND APPLYING FREQUENCY SHIFTS FOR BANDWIDTH EXPANSION

(71) Applicant: Phazr, Inc., Allen, TX (US)

(72) Inventors: Farooq Khan, Allen, TX (US); Robert Clark Daniels, Austin, TX (US); Khurram Muhammad, Fort Worth, TX (US); Eran Pisek, Allen, TX (US); Khalil Haddad, Allen, TX (US); Paul Gilliland, Allen, TX (US)

(73) Assignee: Phazr, Inc., Allen, TX (US)

( * ) Notice: Subject to any disclaimer, the term of this patent is extended or adjusted under 35 U.S.C. 154(b) by 0 days.

(21) Appl. No.: 15/626,066

(22) Filed: Jun. 16, 2017

(65) Prior Publication Data
US 2018/0019797 A1 Jan. 18, 2018

Related U.S. Application Data

(60) Provisional application No. 62/363,209, filed on Jul. 16, 2016.

(51) Int. Cl.
| H04B 7/06 | (2006.01) |
| H04B 7/0413 | (2017.01) |
| H04B 7/08 | (2006.01) |
| H04W 88/10 | (2009.01) |

(52) U.S. Cl.
CPC ......... *H04B 7/0689* (2013.01); *H04B 7/0413* (2013.01); *H04B 7/0871* (2013.01); *H04W 88/10* (2013.01)

(58) Field of Classification Search
CPC .................. H04B 7/0413; H04B 3/52; H04B 2203/5441; H04L 25/03343
USPC ........................................................ 375/299
See application file for complete search history.

(56) References Cited

U.S. PATENT DOCUMENTS

| 5,859,842 | A | * | 1/1999 | Scott | H04B 7/0837 |
| | | | | | 370/342 |
| 7,299,071 | B1 | * | 11/2007 | Barratt | H01Q 1/246 |
| | | | | | 455/277.1 |
| 2009/0180466 | A1 | * | 7/2009 | Soul | H03J 7/04 |
| | | | | | 370/350 |

(Continued)

*Primary Examiner* — Leila Malek
(74) *Attorney, Agent, or Firm* — Michael A. Rahman

(57) ABSTRACT

A wireless access point is configured to communicate in millimeter wave frequency bands in the downlink direction and in sub-6 GHz frequency bands in the uplink direction. The wireless access point includes a signal processing circuit configured to generate different spatial streams signals and a frequency shift circuit configured to apply different frequency shifts to the different spatial streams signals. The wireless access point includes a mixer driven by a local oscillator, which up-converts the frequency shifted signals to millimeter wave frequency band signals, wherein the millimeter wave frequency band signals are transmitted by a MIMO transmit antenna array. A wireless communication device applies different frequency shifts to the different spatial streams signals after down-converting the signals received at a higher millimeter wave frequency to a lower frequency below 6 GHz. The wireless communication device applies no frequency-shifts to different spatial streams signals transmitted at lower frequency below 6 GHz.

20 Claims, 17 Drawing Sheets

(56) References Cited

U.S. PATENT DOCUMENTS

| | | | |
|---|---|---|---|
| 2011/0014889 A1* | 1/2011 | Lipka | H04B 1/1036 |
| | | | 455/296 |
| 2012/0307738 A1* | 12/2012 | Morioka | H04B 7/086 |
| | | | 370/328 |
| 2013/0222613 A1* | 8/2013 | Yehezkely | G06F 3/005 |
| | | | 348/207.1 |
| 2016/0218890 A1* | 7/2016 | Sanderovich | H04L 25/03305 |

* cited by examiner

WIRELESS SYSTEM USING DIFFERENT BANDS IN THE TRANSMIT AND RECEIVE DIRECTION AND APPLYING FREQUENCY SHIFTS FOR BANDWIDTH EXPANSION

CROSS-REFERENCE TO RELATED APPLICATION

This application claims priority to U.S. Provisional Patent Application No. 62/363,209, filed Jul. 16, 2016 and entitled "A WIRELESS SYSTEM USING DIFFERENT BANDS IN THE TRANSMIT AND RECEIVE DIRECTION" which is hereby incorporated by reference in its entirety.

BACKGROUND

The invention generally relates to wireless communications and more specifically to wireless communications using different spectrum bands in the transmit and receive direction.

DESCRIPTION OF THE RELATED ART

Currently, wireless access methods are based on two popular standards: a wide area network (WAN) standard referred to as The Fourth Generation Long Term Evolution (4G LTE) system; and a local area network (LAN) standard called Wi-Fi. Wi-Fi is generally used indoors as a short-range wireless extension of wired broadband systems. The 4G LTE systems on the other hand provide wide area long-range connectivity both outdoors and indoors using dedicated infrastructure such as cell towers and backhaul to connect to the Internet.

As more people connect to the Internet, increasingly chat with friends and family, watch videos, listen to streamed music, and indulge in virtual or augmented reality, data traffic continues to grow at unprecedented rates. In order to address the continuously growing wireless capacity challenge, the next generation of LAN and WAN systems are expected to rely on higher frequencies referred to as millimeter waves in addition to currently used frequency bands below 6 GHz.

SUMMARY OF THE INVENTION

According to disclosed embodiments, a wireless access point (or radio base station) is configured to communicate in millimeter wave frequency bands in the downlink direction and in sub-6 GHz frequency bands in the uplink direction. The wireless access point (or radio base station) comprises a multiple input multiple output (MIMO) transmit antenna array configured to operate in the millimeter wave frequency bands and a multiple input multiple output (MIMO) receive antenna array configured to operate in the sub-6 GHz frequency bands. The wireless access point comprises a signal processing circuit configured to generate different spatial streams signals and a frequency shift circuit configured to apply different frequency shifts to the different spatial streams signals. The wireless access point comprises a mixer driven by a local oscillator, which up-converts the frequency shifted signals to millimeter wave frequency band signals, wherein the millimeter wave frequency band signals are transmitted by the MIMO transmit antenna array.

According to disclosed embodiments, a wireless communication device applies different frequency shifts to the different spatial streams signals after down-converting the signals received at a higher millimeter wave frequency to a lower frequency below 6 GHz. The wireless communication device applies no frequency-shifts to different spatial streams signals transmitted at lower frequency below 6 GHz.

The wireless access point comprises a mixer driven by a local oscillator configured to down-convert the millimeter wave frequency band signals of different spatial streams. The wireless access point comprises a frequency shift circuit configured to apply different frequency shifts to the different spatial streams signals and a signal processing circuit configured to process the down converted signals.

In another embodiment, the wireless access point comprises a signal processing circuit configured to generate a different spatial streams signals and a frequency shift circuit configured to apply frequency shifts to a first group of the different spatial streams signals, wherein no frequency shifts are applied to a second group of the different spatial streams signals.

In yet another embodiment, the wireless access point comprises a frequency shift circuit configured to apply different inverse frequency shifts to the down-converted different spatial streams signals. The different inverse frequency shifts negate the frequency shifts applied to the millimeter wave frequency band signals prior to reception by the MIMO receive antenna array.

DETAILED DESCRIPTION

According to disclosed embodiments, a wireless system uses different spectrum in the transmit and receive directions. In one direction, the wireless system uses conventional radio spectrum below 6 GHz used by 4G LTE and Wi-Fi systems while in the other direction, the system uses higher millimeter wave spectrum. Table 1 lists millimeter wave bands.

TABLE 1

| Examples of millimeter wave bands | | |
|---|---|---|
| Bands [GHz] | Frequency [GHz] | Bandwidth [GHz] |
| 24 GHz Bands | 24.25-24.45 | 0.200 |
|  | 25.05-25.25 | 0.200 |
| LMDS Band | 27.5-28.35 | 0.850 |
|  | 29.1-29.25 | 0.150 |
|  | 31-31.3 | 0.300 |
| 39 GHz Band | 38.6-40 | 1.400 |
| 37/42 GHz Bands | 37.0-38.6 | 1.600 |
|  | 42.0-42.5 | 0.500 |
| 60 GHz | 57-64 | 7.000 |
|  | 64-71 | 7.000 |
| 70/80 GHz | 71-76 | 5.000 |
|  | 81-86 | 5.000 |
| 90 GHz | 92-94 | 2.900 |
|  | 94.1-95.0 |  |
| 95 GHz | 95-100 | 5.000 |

TABLE 1-continued

Examples of millimeter wave bands

| Bands [GHz] | Frequency [GHz] | Bandwidth [GHz] |
| --- | --- | --- |
| 105 GHz | 102-105 | 7.500 |
| | 105-109.5 | |
| 112 GHz | 111.8-114.25 | 2.450 |
| 122 GHz | 122.25-123 | 0.750 |
| 130 GHz | 130-134 | 4.000 |
| 140 GHz | 141-148.5 | 7.500 |
| 150/160 GHz | 151.5-155.5 | 12.50 |
| | 155.5-158.5 | |
| | 158.5-164 | |

Figure 1:
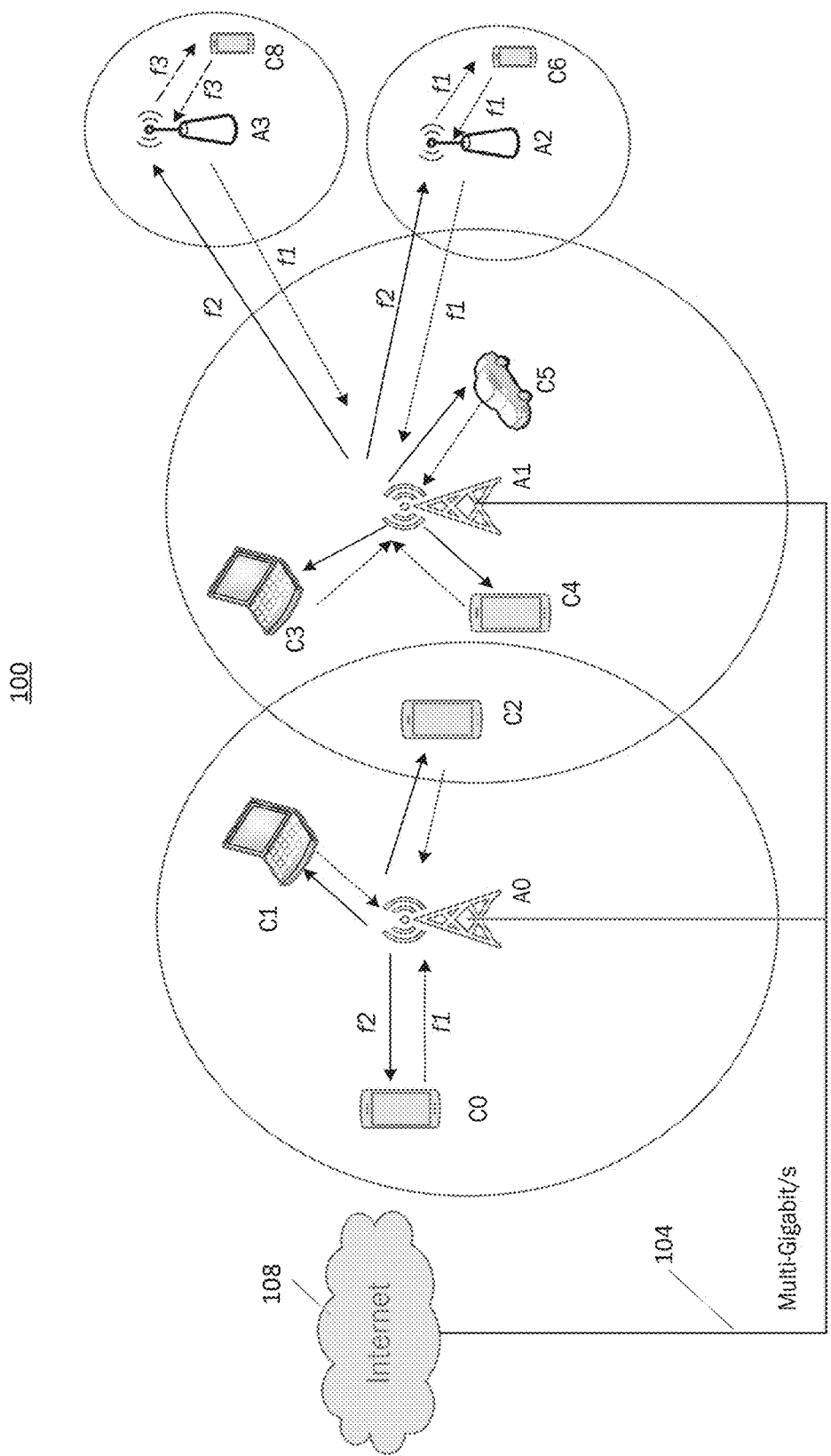
FIG. 1 illustrates a wireless network according to disclosed embodiments.

FIG. 1 illustrates an exemplary wireless network 100 according to disclosed embodiments. The wireless network 100 relies on different spectrum in the transmit and receive directions to/from anchor access points (or radio base stations) A0 and A1 which provide service to communication devices C0-C5 and to non-anchor access points A1 and A3 in its coverage area. The anchor access points A0 and A1 are connected to the Internet 104 (or any other telecommunications network) using Gigabit/s high-speed wired links 104 such as optical fiber communications. The non-anchor access points A2 and A3 do not rely on wired high-speed links but rather connect to the Internet 108 (or any other telecommunications network) via wireless links to the access points A0 and A1.

The anchor access point A0 provides services to communication devices C0, C1 and C2 using frequency $f_2$ on the downlink and frequency $f_1$ on the uplink. Similarly, anchor access point A1 provides services to communication devices C3, C4 and C5 using frequency $f_2$ on the downlink and frequency $f_1$ on the uplink. First non-anchor access point A2 communicates with the anchor access point A1 using frequency $f_2$ in the direction from A1 to A2 and on frequency $f_1$ in the direction from A2 to A1.

Second non-anchor access point A3 communicates with the anchor access point A1 using frequency $f_2$ in the direction from A1 to A3 and frequency $f_1$ in the direction from A3 to A1. The non-anchor access points A2 provides services to communication device C6 on frequency $f_1$. The non-anchor access points A3 provides service to communication device C7 on a third frequency $f_3$. Alternatively, the third frequency $f_3$ can be the same as the first frequency $f_1$ or second frequency $f_2$.

Figure 2:
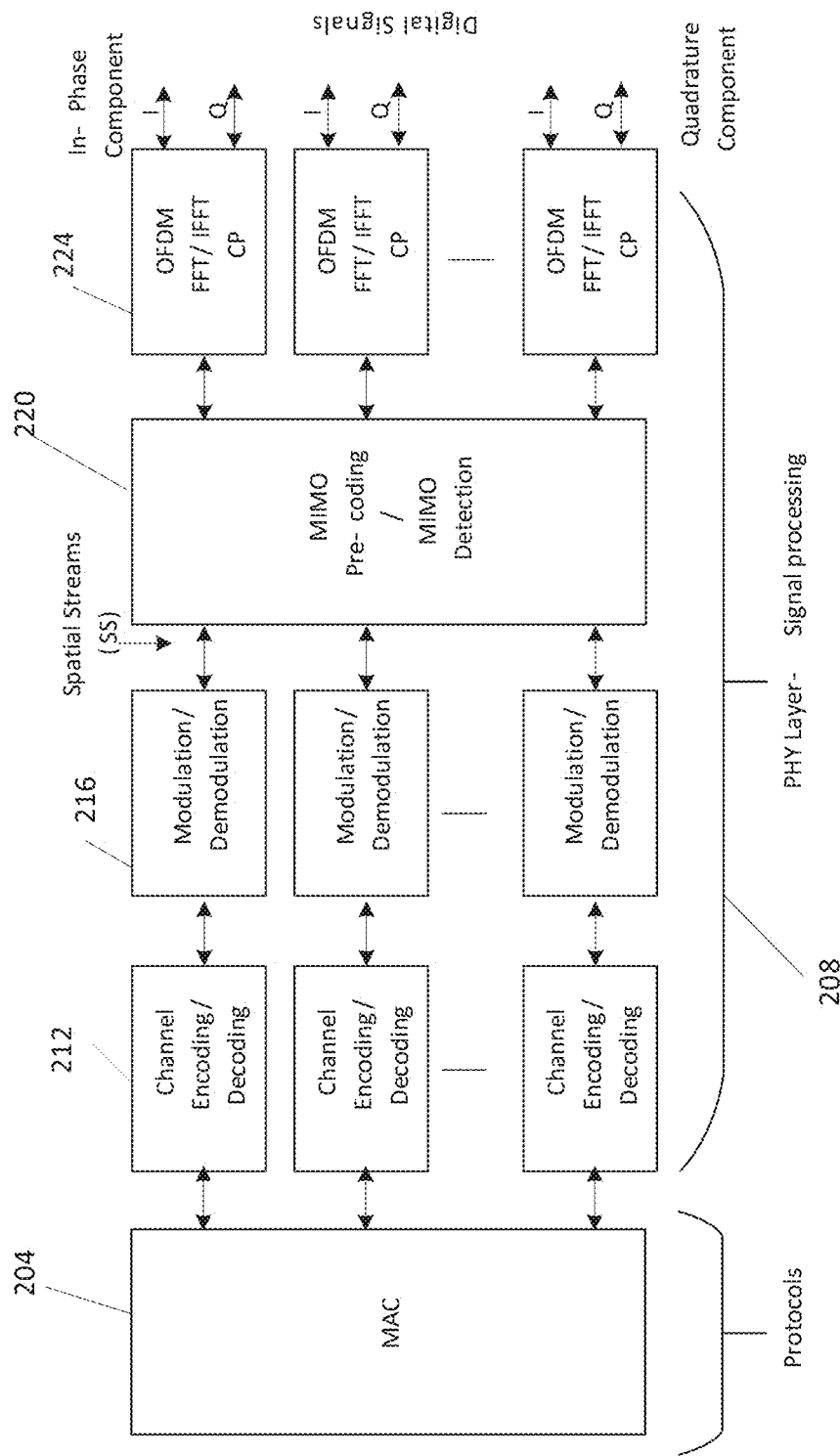
FIGS. 2 and 3 illustrate a wireless communications chain in accordance with disclosed embodiments.
Figure 3:
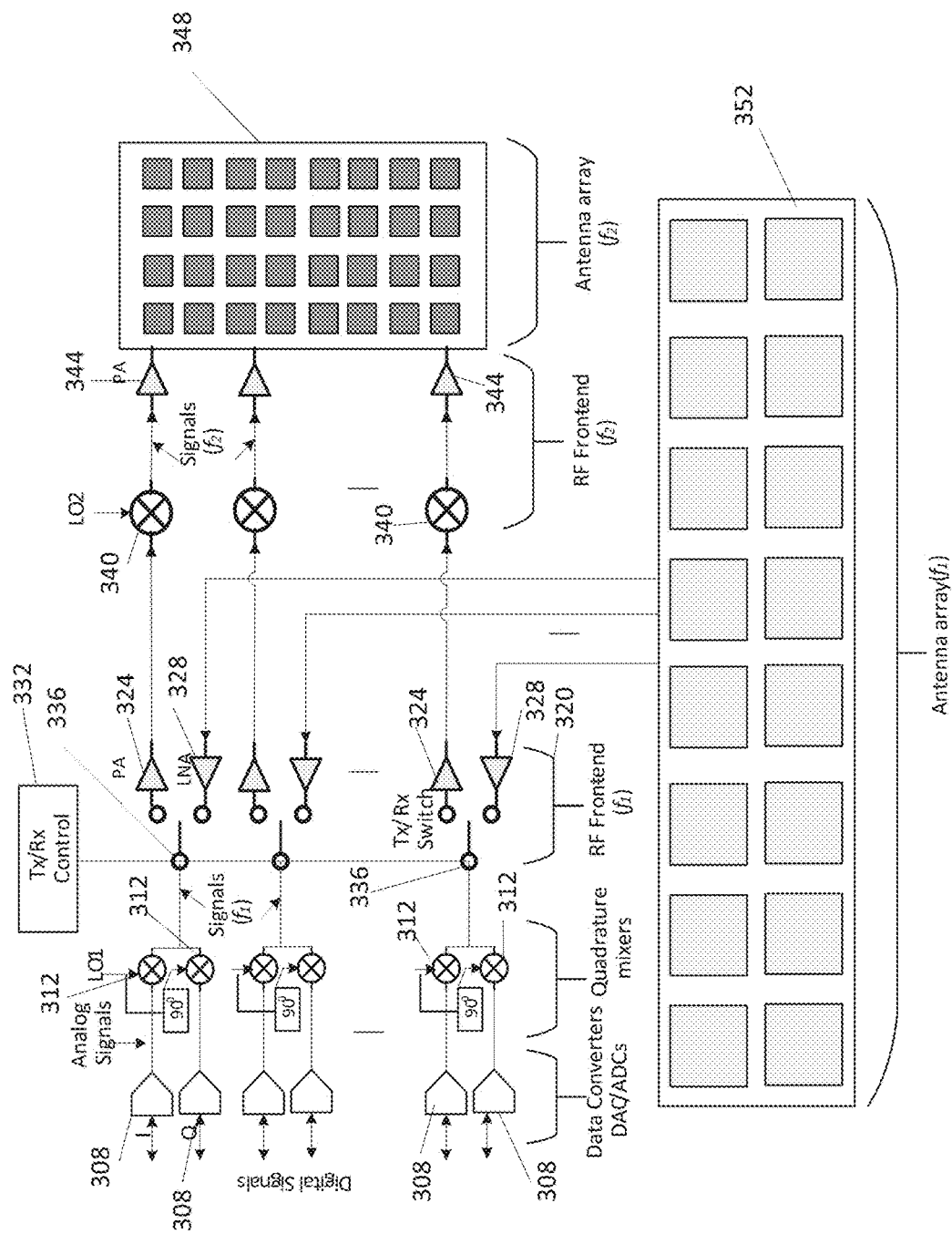

FIGS. 2 and 3 illustrate a wireless communications chain in accordance with disclosed embodiments. The wireless communications chain transmits and receives at two different frequencies. The wireless communications chain may be implemented in the access points A0-A3 and the communication devices C0-C8.

Referring to FIG. 2, the wireless communications chain includes Medium Access Control (MAC) 204 and Physical (PHY) layer 208 functions. In some embodiments, same MAC 204 protocol or Physical layer 208 may be used in the two directions at frequency $f_1$ and frequency $f_2$ allowing components re-use thereby reducing system cost and form factor. The Physical (PHY) layer 208 functions include channel encoding and decoding 212 schemes such as low-density parity check (LDPC) codes, modulation and demodulation 216 schemes such as BPSK, QPSK, 16-QAM, 64-QAM and 256-QAM, MIMO precoding and detection 220 schemes, and multiple access schemes such as orthogonal frequency division multiplexing (OFDM) 224.

Referring now to FIG. 3, in the transmit direction at a frequency $f_2$, the physical layer 208 provides digital baseband In-Phase (I) and Quadrature (Q) signals that are converted into analog baseband In-Phase (I) and Quadrature (Q) signals using a set of data converters (DAC/ADCs) 308. The analog baseband In-Phase (I) and Quadrature (Q) signals are modulated using a set of quadrature modulators or quadrature mixers 312 driven by a first Local Oscillator (LO1) generating a set of signals at frequency $f_1$. These signals at frequency $f_1$ can optionally be amplified using a RF front-end 320. The RF front end 320 includes power amplifiers 324 and low noise amplifiers 328. A control function 332 sends a signal to switches 336 to enable connection to the power amplifiers 324 operating at frequency $f_1$. Mixers 340 driven by a second local oscillator (LO2) convert the signals to a frequency $f_2$. These signals are amplified by power amplifiers 344 operating at frequency $f_2$ and transmitted by an antenna array 348 operating at frequency $f_2$. According to some disclosed embodiments, the antenna array 348 is configured to transmit millimeter wave band signals.

To receive signals in the receive direction at frequency $f_1$, the control function 332 sends a signal to the switches 336 to enable connections to the low-noise amplifiers (LNA) 328. The signals received at an antenna array 352 operating at frequency $f_1$ are amplified by the low-noise amplifiers (LNAs) 328 and demodulated using a set of quadrature modulators or quadrature mixers 312 driven by the first Local Oscillator (LO1) generating a set of analog baseband In-Phase (I) and Quadrature (Q) signals. The analog baseband In-Phase (I) and Quadrature (Q) signals are converted to digital baseband In-Phase (I) and Quadrature (Q) signals using a set of analog-to-digital converters (ADCs) 308. These digital baseband In-Phase (I) and Quadrature (Q) signals are fed into the physical (PHY) layer 208 where they undergo digital signal processing.

According to disclosed embodiments, the MAC 204 and PHY 208 layers are implemented on application-specific integrated circuit (ASIC) system-on-a-chip (SoC). In some implementations, the SoC includes the digital-to-analog (DAC) and analog-to-digital converter (ADC) functions. In other implementations, a radio frequency integrated circuit (RFIC) incorporating quadrature mixers, amplification and filtering functions are implemented on the system-on-a-chip (SoC).

Figure 4:
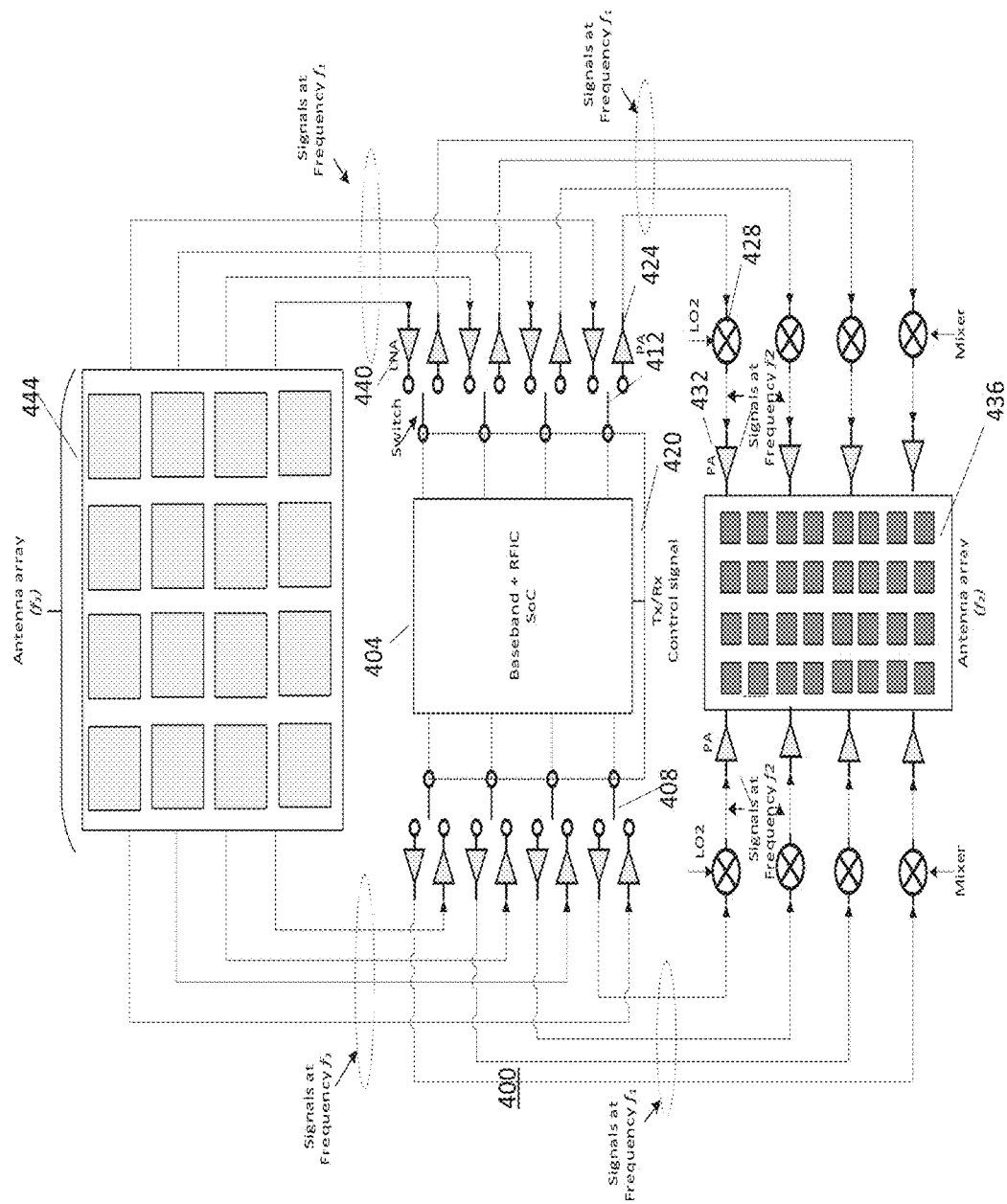
FIGS. 4-10 illustrate various disclosed embodiments according to the principles of the invention.

FIG. 4 illustrates a system 400 configured for multiple input multiple output (MIMO) and beamforming for transmission and reception at two different frequencies according to the principles of the current invention. The system 400 includes a system-on-chip (SoC) 404 that implements MAC, Physical (PHY) layers as well as a radio frequency integrated circuit (RFIC) including quadrature mixers illustrated in FIGS. 2 and 3.

The SoC 404 outputs signals centered at frequency $f_1$. The SoC 404 can support transmission of M multiple input multiple output (MIMO) spatial streams (SS). In the exemplary embodiment illustrated in FIG. 4, the SoC 404 supports eight spatial streams. However, in other embodiments, the number of spatial streams supported by the SoC 404 can be any integer number (e.g., 2, 4, 8, 12, 16, 18, 24, 32, 64).

The SoC 404 applies Tx/Rx control signal 420 to switches 408 and 412 to switch between transmit and receive modes. The signals at frequency $f_1$ out of the SoC 404 can optionally be amplified by using a RF front-end. The transmit/receive control signal 420 is provided to the switches 408 to enable connection to power amplifiers 424 operating at frequency $f_1$. Mixers 428 driven by a second local oscillator (LO2)

convert the signals to a frequency $f_2$. These signals are amplified by power amplifiers 432 operating at frequency $f_2$ and transmitted by antenna array 436 operating at frequency $f_2$.

To receive signals in the receive direction at frequency $f_1$, Tx/Rx control signal 420 is applied to the switches 408 and 412 to enable connections to the low-noise amplifiers (LNA) 440. The signals received at the antenna array 444 operating at frequency $f_1$ are amplified by the low-noise amplifiers (LNAs) 440 and fed into the SoC 404.

Figure 5:
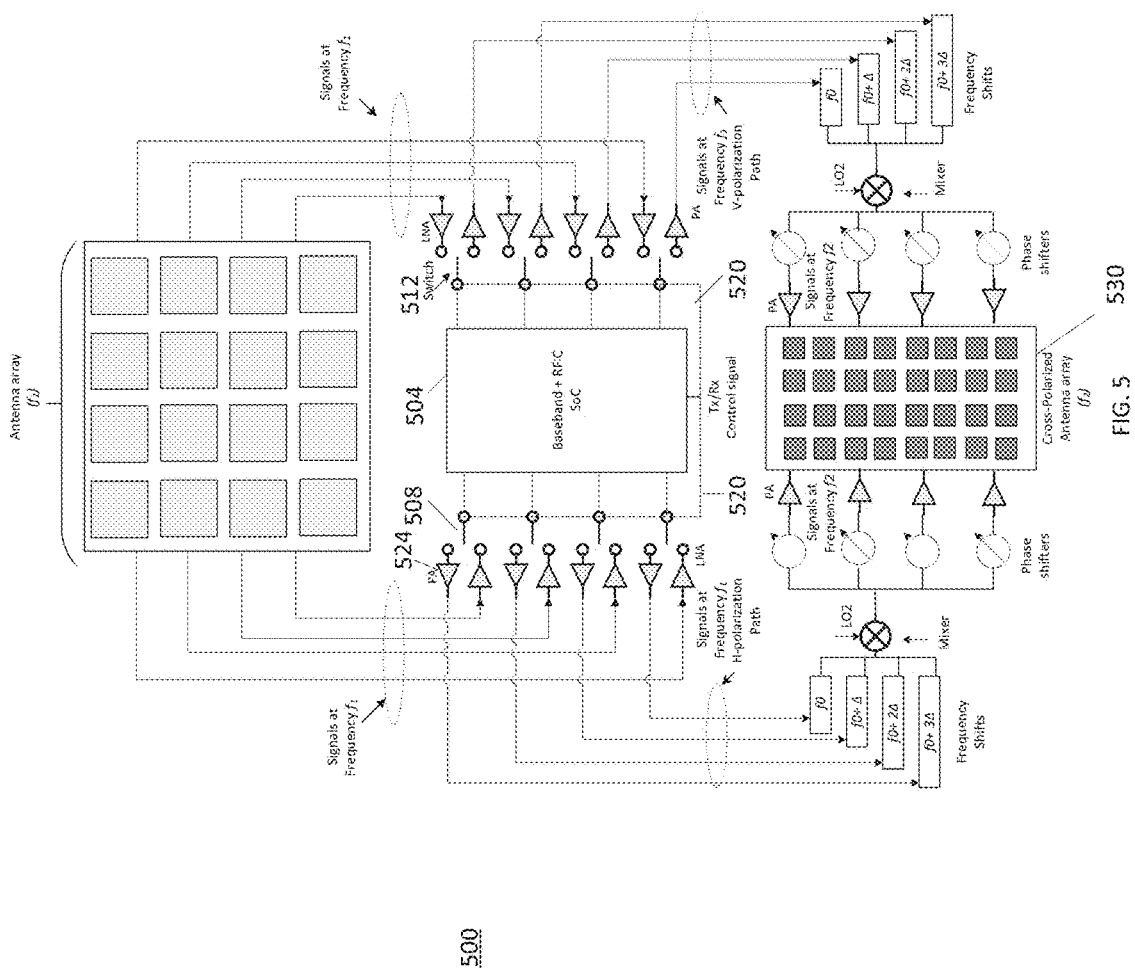

FIG. 5 illustrates a system 500 that features transmit bandwidth expansion when multiple input multiple output (MIMO) technique is used. The bandwidth expansion enables transmission of signals at wider bandwidths compared to the bandwidth of a single transmit chain. The bandwidth expansion is achieved by applying frequency sifts to signals from different antennas. When these frequency-shifted signals are transmitted over the air, they occupy larger bandwidth compared to the bandwidth of signals from a single antenna. The system 500 transmits at frequency $f_2$ and receives signals at frequency $f_1$. In the system 500, a frequency shift is applied to the spatial streams generated by the SoC 504 to implement bandwidth expansion.

Referring to FIG. 5, the SoC 504 sends a Tx/Rx control signal 520 to the switches 508 and 512 to enable connection to the power amplifiers 524 operating at frequency $f_1$. In the exemplary embodiment of FIG. 5, eight spatial streams are divided into two groups of four spatial streams each, first group for transmission on the horizontally polarized antennas 530 and the second group for transmission on the vertically polarized antennas 530.

A frequency shift of $f_0$ is applied to the first spatial stream in each group, a frequency shift of $f_0+\Delta$ is applied to the second spatial stream in each group, a frequency shift of $f_0+2\Delta$ is applied to the third spatial stream in each group and finally a frequency shift of $f_0+3\Delta$ is applied to the fourth spatial stream in each group. Optionally, $f_0$ can be set to zero. For example, when the carrier frequency $f_2$ of the transmit signals is $f_2$=28 GHz, $f_0$=0 and $\Delta$=160 MHz=0.16 GHz, a frequency shift of 0 is applied to the first spatial stream in each group, a frequency shift of 0.16 GHz is applied to the second spatial stream in each group, a frequency shift of 0.32 GHz is applied to the third spatial stream in each group and finally a frequency shift of 0.48 GHz is applied to the fourth spatial stream in each group. Thus the carrier frequency for the first, second, third and fourth spatial stream are 28 GHz, 28.16 GHz, 28.32 GHz and 28.48 GHz respectively. Alternatively, frequency shifts are applied to signals from different antennas which may be precoded spatial stream signals.

The frequency shifted signals are combined separately for horizontal and vertical polarization signal paths. According to some disclosed embodiments, $\Delta=-\Omega$ where any frequency shift comprises $\Delta$, however other values may be selected for $\Delta$. Mixers 512 and 516 driven by local oscillators (LO2) convert the signals to a frequency $f_2$. These up-converted signals can optionally be split into multiple paths and appropriate phased shifting can be applied to achieve analog beamforming. The phase-shifted signals on the horizontal and vertical polarization paths are amplified by power amplifiers 524 operating at frequency $f_2$ and transmitted by the antenna array 528 operating at frequency $f_2$.

By applying different frequency shifts to the spatial streams, the spatial streams can be made to occupy different channels in the electromagnetic spectrum, thus decreasing statistical correlation between spatial streams or signals from different antennas. Also, as the spatial streams occupy different channels in the electromagnetic spectrum, data is transmitted over a wider bandwidth, which increases data throughput. Also, high dimension MIMO processing is achieved in the transceiver by adapting the frequency shifts even if the wireless propagation conditions do not support high dimension MIMO processing.

In the embodiment illustrated in FIG. 5, the frequency shifts are applied to the signals at frequency $f_1$ after amplification by the power amplifiers operating at frequency $f_1$. In other embodiments, the frequency shifts may be applied to the signals at frequency $f_1$ before amplification. In yet other embodiments, the frequency shifts are applied to the signals before the RFIC in the baseband.

Figure 6:
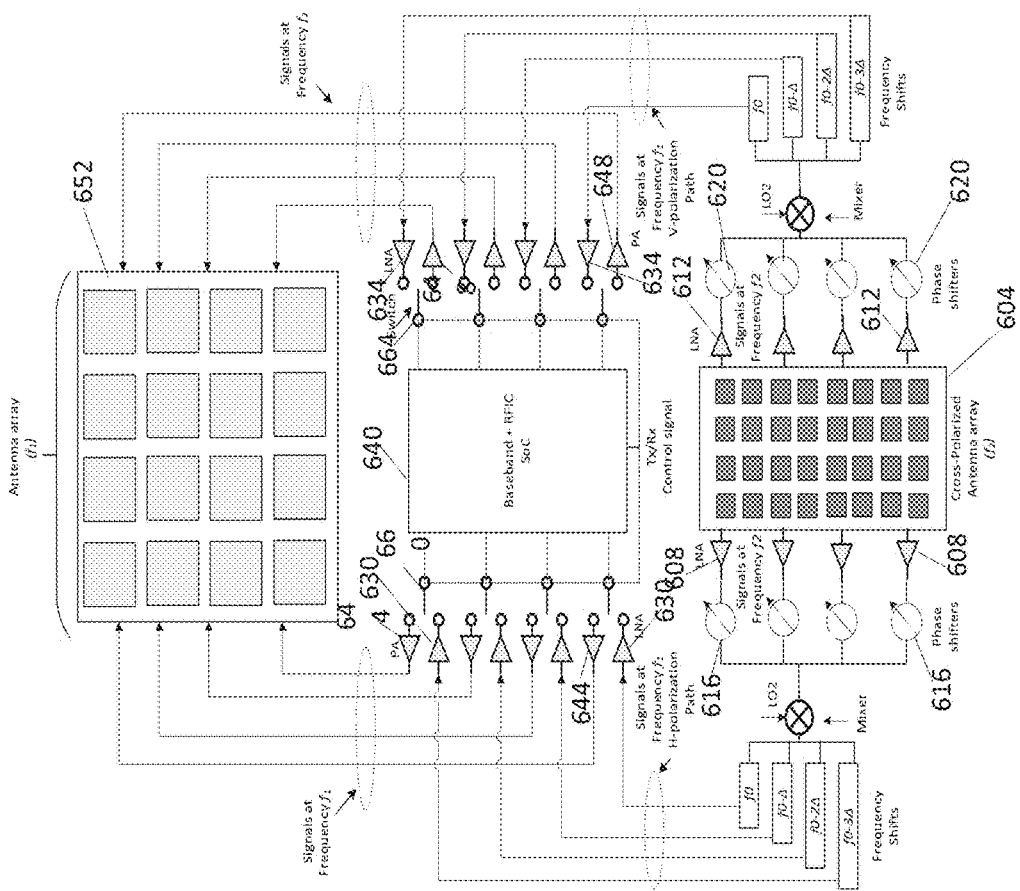

FIG. 6 illustrates reception of bandwidth expanded signals in a MIMO wireless communication system 600 employing transmission and reception at two different frequencies. The higher millimeter wave signals received on the vertically and horizontally polarized antennas 604 are amplified by low noise amplifiers (LNA) 608 and 612 operating at frequency $f_2$. Phase shifting can be applied by phase shifters 616 and 620 to the amplified signals and the resulting signals are combined coherently on each of the horizontal and vertical polarization paths to provide the analog beamforming gain. The resulting signals on the horizontal and vertical polarization paths are down-converted to lower frequency $f_1$ by mixers 616 driven by local oscillators (LO2). The down-converted signals are optionally filtered and split into two sets of four signal streams.

The first received signal stream is frequency shifted down by $f_0$ in each group, the second signal stream is frequency shifted down by $f_0-\Delta$ in each group, the third signal stream is frequency shifted down by $f_0-2\Delta$ in each group and finally the fourth signal stream is frequency shifted by $f_0-3\Delta$ in each group. Optionally, $f_0$ can be set to zero. For example, when the frequencies of the receive signals for the first, second, third and fourth spatial stream are 28 GHz, 28.16 GHz, 28.32 GHz and 28.48 GHz respectively and $f_0$=0 and $\Delta$=160 MHz=0.16 GHz, the first spatial stream signal is down-shifted by 0, the second spatial stream signal is down-shifted by 0.16 GHz, the third spatial stream signal is down-shifted by 0.32 GHz, and finally the fourth spatial stream signal is down-shifted by 0.48 GHz. This makes all spatial stream signals to be centered at 28 GHz. Alternatively, frequency shifts are applied to signals from different antennas signals.

As described before, $\Delta=-\Omega$ or any other suitable value. The resulting signals from frequency translation that are now centered at the same frequency are amplified by the low-noise-amplifiers (LNAs) 630 and 634 operating at frequency $f_1$ and fed into the eight spatial streams inputs of the SoC 640. The frequency translation can be performed either using real or quadrature mixers. In case of real mixers, signal spectrum at image frequency is created which is suppressed using bandpass filters. In the receive path, the image signal may not be eliminated as the filtering in the receiver can accommodate for this undesired signal and reject it.

In the embodiment illustrated in FIG. 6, the eight signal streams are each frequency shifted to remove the frequency shifts added by the transmitter (as illustrated in FIG. 5). The value of the frequency shifts in the receiver are the negative value of the frequency shifts in the transmitter. In general, the purpose of frequency shifts illustrated in FIG. 6 is to invert the frequency shifts illustrated in FIG. 5.

The frequency shifts can also be applied during up-conversion by using frequency shifted values for the Local Oscillator (LO2). For example, if $f_1$=5 GHz and $f_2$=28 GHz, a Local Oscillator (LO2) value of 23 GHz can be used to up-convert 5 GHz to 28 GHz (23+5=28 GHz). A Local Oscillator (LO2) value of 23.16 GHz can be used to up-convert 5 GHz to 28.16 GHz (23.16+5=28.16 GHz). A Local Oscillator (LO2) value of 23.32 GHz can be used to up-convert 5 GHz to 28.32 GHz (23.32+5=28.32 GHz). A Local Oscillator (LO2) value of 23.48 GHz can be used to up-convert 5 GHz to 28.48 GHz (23.48+5=28.48 GHz).

The frequency shifts can also be applied during down-conversion by using frequency shifted values for the Local Oscillator (LO2). For example, if $f_1$=5 GHz and $f_2$=28 GHz, a Local Oscillator (LO2) value of 23 GHz can be used to down-convert 28 GHz to 5 GHz (28−23=5 GHz). A Local Oscillator (LO2) value of 23.16 GHz can be used to down-convert 28.16 GHz to 5 GHz (28.16−23.16=5 GHz). A Local Oscillator (LO2) value of 23.32 GHz can be used to down-convert 28.32 GHz to 5 GHz (28.32−23.32=5 GHz). A Local Oscillator (LO2) value of 23.48 GHz can be used to down-convert 28.48 GHz to 5 GHz (28.48−23.48=5 GHz).

To transmit signals at frequency $f_1$, Tx/Rx control signal is applied to the switches 660 and 664 to enable connections to the power amplifiers 644 and 648 operating at frequency $f_1$. The amplified signals at frequency $f_1$ are transmitted from the antenna array 652 operating at frequency $f_1$.

Figure 7:
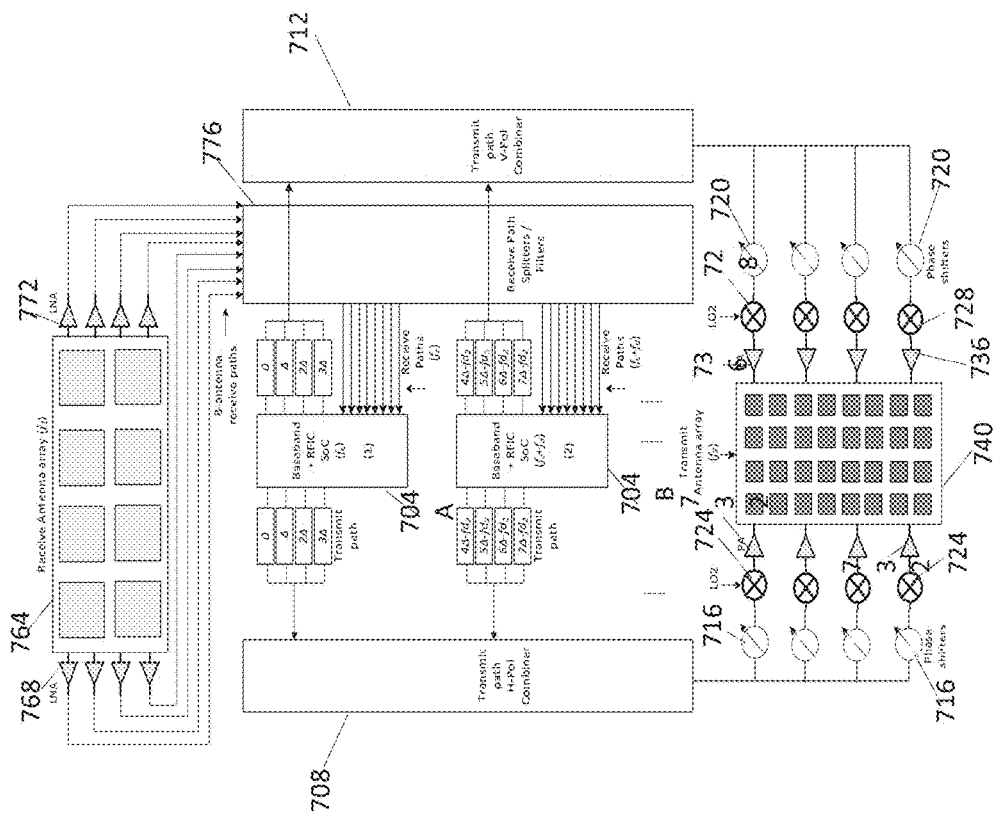

FIG. 7 illustrates a system 700 comprising multiple SoCs 704A-704N that feature transmit bandwidth expansion when multiple input multiple output (MIMO) technique is used. The system 700 transmits signals at frequency $f_2$ and receives signals at frequency $f_1$. The signals at frequency $f_1$ out of the SoCs can optionally be amplified by using a RF front-end.

According to disclosed embodiments, eight transmit spatial streams from each SoC are divided into two groups of four spatial streams each, first group for transmission on the horizontally polarized antennas and the second group for transmission on the vertically polarized antennas.

For the SoC 704A, no frequency shift is applied to the first spatial stream in each group, a frequency shift of $\Delta$ is applied to the second spatial stream in each group, a frequency shift of $2\Delta$ is applied to the third spatial stream in each group and finally a frequency shift of $3\Delta$ is applied to the fourth spatial stream in each group. The four signals on each of the horizontal and vertical polarization paths are combined and the resulting signals are input respectively to the horizontal and vertical polarization combiners that combine the signals across the multiple SoCs.

For the SoC 704B, a frequency shift of $4\Delta-f_{d2}$ is applied to the first spatial stream in each group, a frequency shift of $5\Delta-f_{d2}$ is applied to the second spatial stream in each group, a frequency shift of $6\Delta-f_{d2}$ is applied to the third spatial stream in each group and finally a frequency shift of $7\Delta-f_{d2}$ is applied to the fourth spatial stream in each group. Here, $f_{d2}$ represents the frequency offset of the center frequency of the SoC 704 B relative to the SoC 704A. For example, when the signals out of the SoC 704A are centered at frequency $f_c$ and the signals out of the SoC 704B are centered at frequency $f_c+f_{d2}$. Similarly, $f_{d3}$ represents the frequency offset of the center frequency of the third SoC (not shown in FIG. 7) relative to the SoC 704A. In other embodiments, $f_{d2}$, $f_{d3}$ and $f_{d4}$ etc. can be set to zero.

For example, when the carrier frequency $f_2$ of the transmit signals is $f_2$=28 GHz, $f_0$=0 and $\Delta$=160 MHz=0.16 GHz, the carrier frequencies for the first, second, third and fourth spatial stream from the first SoC are 28 GHz, 28.16 GHz, 28.32 GHz and 28.48 GHz respectively. Assuming, $f_{d2}$=0, the carrier frequencies for the first, second, third and fourth spatial stream from the second SoC are 28.64 GHz, 28.80 GHz, 28.96 GHz and 29.12 GHz respectively. Alternatively, frequency shifts are applied to signals from different antennas which may be precoded spatial stream signals.

Different values for $f_{d2}$, $f_{d3}$ and $f_{d4}$ etc. allows to accommodate different $f_1$ frequencies from different SoCs. For example, $f_1$ frequencies can be centered at 5.0 and 5.2 GHz for the first and the second SoC respectively. In this case $f_{d2}$=5.2−5.0=0.2 GHz, a frequency shift of $4\Delta-f_{d2}$ is applied to the first spatial stream in each group, a frequency shift of $5\Delta-f_{d2}$ is applied to the second spatial stream in each group, a frequency shift of $6\Delta-f_{d2}$ is applied to the third spatial stream in each group and finally a frequency shift of $7\Delta-f_{d2}$ is applied to the fourth spatial stream in each group in the second SoC which makes the carrier frequencies for the first, second, third and fourth spatial stream from the second SoC at 28.64 GHz, 28.80 GHz, 28.96 GHz and 29.12 GHz respectively. Thus the signals from the first SoC and the second SoC centered at 28 GHz, 28.16 GHz, 28.32 GHz, 28.48 GHz, 28.64 GHz, 28.80 GHz, 28.96 GHz and 29.12 GHz will occupy contiguous frequency spectrum of 27.92-29.2 GHz with channel size $\Delta$=160 MHz which is 8 times 160 MHz or 1.28 GHz (27.92-29.2 GHz). For example, for $\Delta$=0.16 GHz, for the fourth spatial stream total frequency shift applied would be $7\Delta-f_{d2}$=1.12−0.2=0.920 GHz making the center frequency $f_2$=5.2+0.920 GHz=6.12 GHz which will be up-converted to 29.12 GHz (23+6.12=29.12 GHz). Alternatively, shifts can be applied during the up-conversion process by frequency-shifting the Local Oscillator (LO2) as discussed earlier.

The four signals on each of the horizontal and vertical polarization paths are combined and the resulting signals are input respectively to the horizontal and vertical polarization combiners 708 and 712 that combine the signals across the multiple SoCs. The foregoing pattern of frequency-shifts continues for the remaining SoCs in the system 700. Thus, a unique frequency shift is applied to each pair of horizontal and vertical spatial streams (SS). A phase shifting by phase shifters 716 and 720 can be applied for the analog beamforming on the combined frequency shifted signals of multiple spatial streams (SS) and multiple SoCs. The resulting signals are up-converted by the mixers 724 and 728 driven by local oscillators (LO2). In alternative embodiments, the phased shifting for the analog beamforming is applied after up-conversion to frequency $f_2$. The up-converted signals on the horizontal and vertical polarization paths are amplified by the power amplifiers 732 and 736 and transmitted on the horizontally and vertically polarized antennas 740 respectively at frequency $f_2$.

The receive signals at frequency $f_1$ from receive antennas 764 are amplified by low-noise-amplifiers (LNAs) 768 and 772 and are split by splitter 776 and optionally filtered before feeding into the SoCs 704A-704N. In other embodiments, horizontally and vertically polarized antennas can also be used for the receiving signals at frequency $f_1$.

Figure 8:
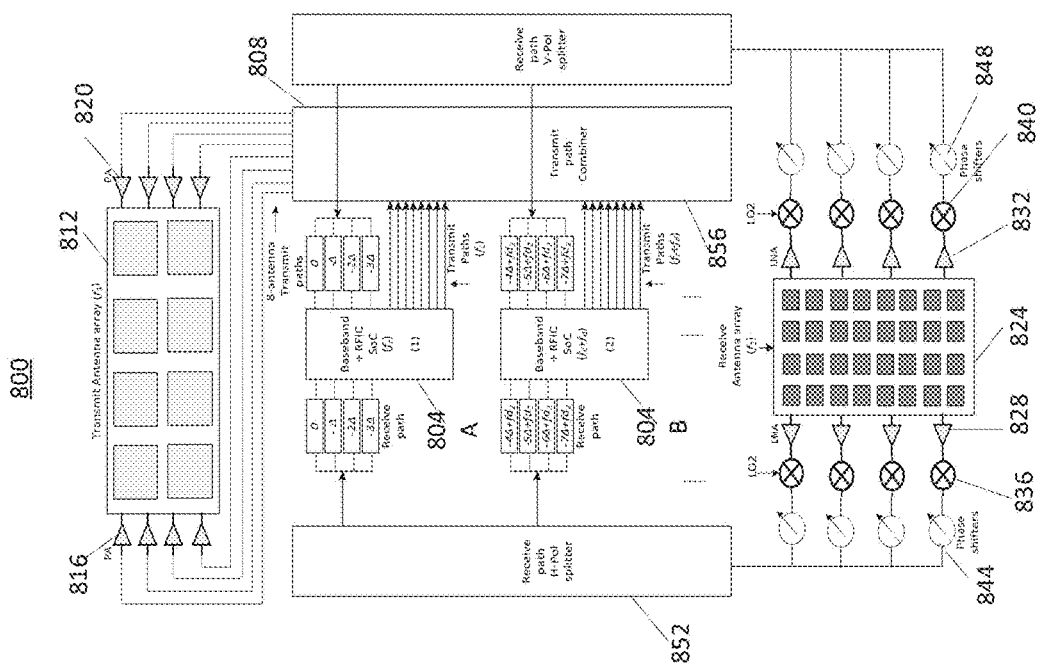

FIG. 8 illustrates bandwidth expansion for the case of multiple SoCs employing different center frequencies. In FIG. 8, a system 800 comprising SoCs 804A-804N each employ different center frequencies.

The system 800 transmits signals at frequency $f_1$ and receives signals at frequency $f_2$. The signals at frequency $f_1$ out of the SoCs can optionally be amplified by using a RF front-end.

The transmit signals at frequency $f_1$ from SoCs 804A-804N are combined by combiner 808 for transmission by the antennas 812 operating at frequency $f_1$. The combined transmit signals can optionally be amplified by a set of power amplifiers (PA) 816 and 820 before transmission by the antennas 812 over the air. In other embodiments, horizontally and vertically polarized antennas can also be used for transmitting signals at frequency $f_1$.

The received signals on the horizontally and vertically polarized antennas 824 at frequency $f_2$ are amplified by a set of LNAs 828 and 832 and down-converted frequency $f_1$ by the mixers 836 and 840 driven by local oscillators (LO2).

A phase-shifting to achieve receive beamforming gain is applied to the down-converted signals by using a set of phase shifters 844 and 848. In alternative embodiments, the phased shifting for the analog beamforming is applied before down-conversion to frequency $f_1$. The down-converted signals on the horizontal and vertical polarization paths are split by splitters 852 and 856 for feeding into the multiple SoCs 804A-804N.

For the signals destined for the SoC 804A, no frequency shift is applied to the first spatial stream in each group, a frequency shift of $-\Delta$ is applied to the second spatial stream in each group, a frequency shift of $-2\Delta$ is applied to the third spatial stream in each group and finally a frequency shift of $-3\Delta$ is applied to the fourth spatial stream in each group. The four signals on each of the horizontal and vertical polarization paths are then fed into the SoC 804A.

For the SoC 804B, a frequency shift of $-(4\Delta-f_{d2})$ is applied to the first spatial stream in each group, a frequency shift of $-(5\Delta-f_{d2})$ is applied to the second spatial stream in each group, a frequency shift of $-(6\Delta-f_{d2})$ is applied to the third spatial stream in each group and finally a frequency shift of $-(7\Delta-f_{d2})$ is applied to the fourth spatial stream in each group. The four signals on each of the horizontal and vertical polarization paths are then fed into the SoC 804B.

This pattern of frequency-shifts continues for the remaining SoCs in the system. Thus, a unique frequency shift is applied to each pair of horizontal and vertical spatial streams (SS).

Figure 9:
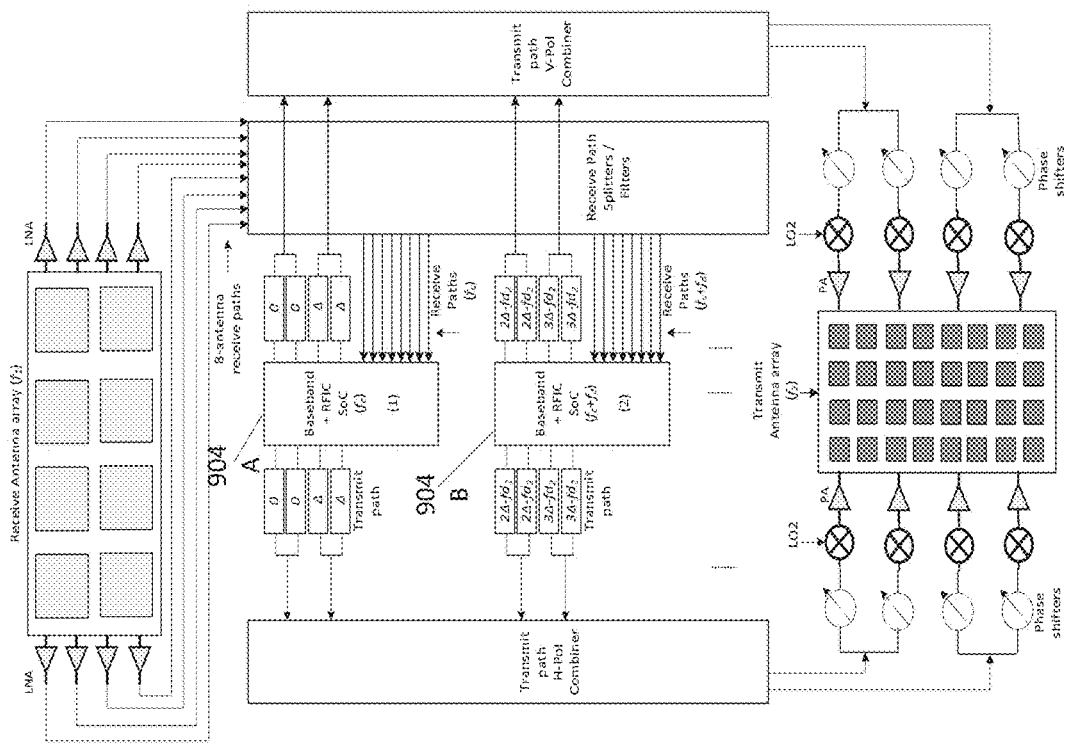

FIG. 9 illustrates partial transmit bandwidth expansion by a system 900 featuring multiple SoCs. The system 900 transmits signals at frequency $f_2$ and receives signals at frequency $f_1$. The signals at frequency $f_1$ out of the SoC can optionally be amplified by using a RF front-end.

Referring to FIG. 9, eight transmit spatial streams are divided into two groups of four spatial streams each, first group for transmission on the horizontally polarized antennas and the second group for transmission on the vertically polarized antennas.

For the SoC 904A, no frequency shift is applied to the first and second spatial streams in each group, a frequency shift of $\Delta$ is applied to the third and fourth spatial streams in each group.

For the SoC 904B, a frequency shift of $2\Delta-f_{d2}$ is applied to the first and second spatial streams in each group, a frequency shift of $3\Delta-f_{d2}$ is applied to the third and fourth spatial streams in each group. The signals on each of the horizontal and vertical polarization paths are combined and the resulting signals are input respectively to the horizontal and vertical polarization combiners that combine the signals across the multiple SoCs.

This pattern of frequency-shifts continues for the remaining SoCs in the system. A phased shifting can be applied for the analog beamforming on the combined frequency shifted signals of multiple spatial streams (SS) and multiple SoCs. The resulting signals are up-converted by the mixers driven by a local oscillator (LO2). In alternative embodiments, the phased shifting for the analog beamforming is applied after up-conversion to frequency $f_2$. The up-converted signals on the horizontal and vertical polarization paths are amplified by the power amplifiers and transmitted on the horizontally and vertically polarized antennas respectively at frequency $f_2$.

The receive signals at frequency $f_1$ for each of the receive antennas are amplified by low-noise-amplifiers (LNAs) and are split and optionally filtered before feeding into the multiple SoCs.

Figure 10:
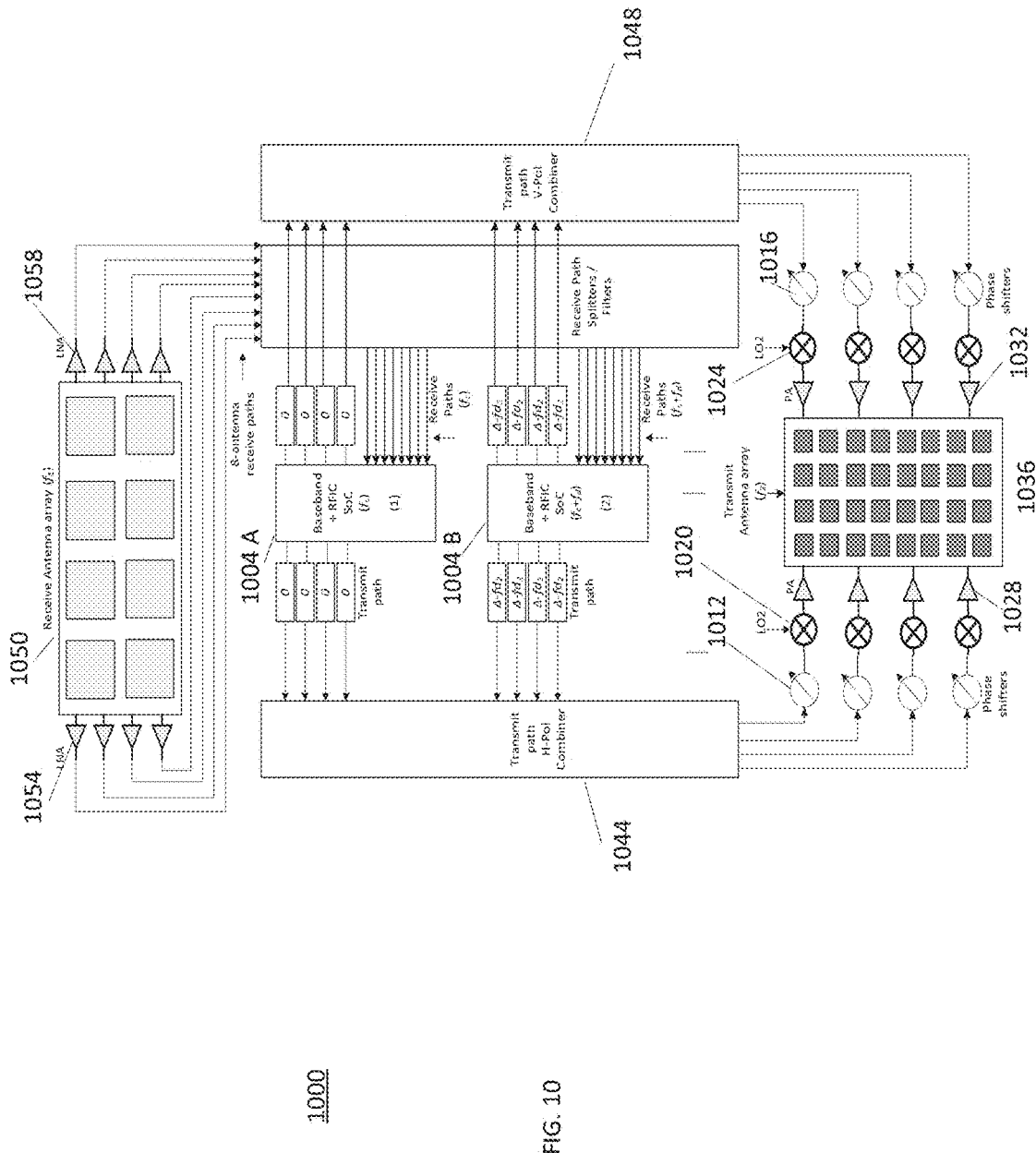

FIG. 10 illustrates transmit bandwidth expansion across multiple SoCs when multiple input multiple output (MIMO) technique is used in a wireless communication system 1000 employing transmission and reception at two different frequencies. The system 1000 transmits signals at frequency $f_2$ and receives signals at frequency $f_1$. The signals at frequency $f_1$ out of the SoC can optionally be amplified by using a RF front-end.

Referring to FIG. 10, eight transmit spatial streams into two groups of four spatial streams each, first group for transmission on the horizontally polarized antennas and the second group for transmission on the vertically polarized antennas.

For the SoC 1004A, no frequency shift is applied to any of the spatial streams. For the SoC 1004B, a frequency shift of $\Delta-f_{d2}$ is applied to all spatial streams. The signals on each of the horizontal and vertical polarization paths are input respectively to the horizontal and vertical polarization combiners 1044 and 1048 that combine the signals across the multiple SoCs. This pattern of frequency-shifts continues for the remaining SoCs in the system. A phased shifting can be applied by phase shifters 1012 and 1016 for the analog beamforming on the combined frequency shifted signals of multiple SoCs. The resulting signals are up-converted by mixers 1020 and 1024 driven by a local oscillator (LO2). In alternative embodiments, the phased shifting for the analog beamforming is applied after up-conversion to frequency $f_2$. The up-converted signals on the horizontal and vertical polarization paths are amplified by the power amplifiers 1028 and 1032 and transmitted on the horizontally and vertically polarized antennas 1036 respectively at frequency $f_2$.

The receive signals at frequency $f_1$ for each of the receive antennas 1050 are amplified by low-noise-amplifiers (LNAs) 1054 and 1058 and are split and optionally filtered before feeding into the multiple SoCs.

Figure 11:
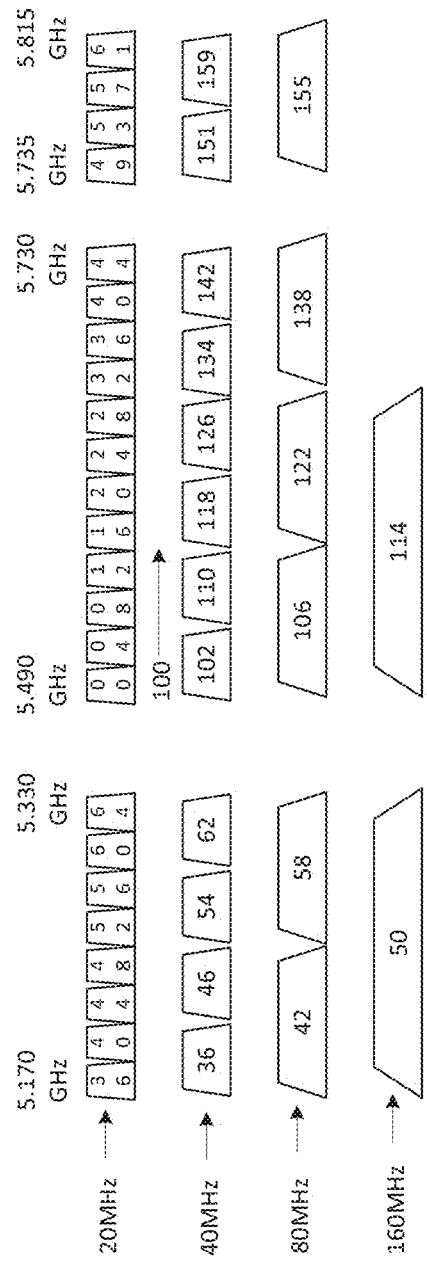
FIGS. 11-16 illustrate use of spectrum in the receive and transmit directions.
Figure 12:
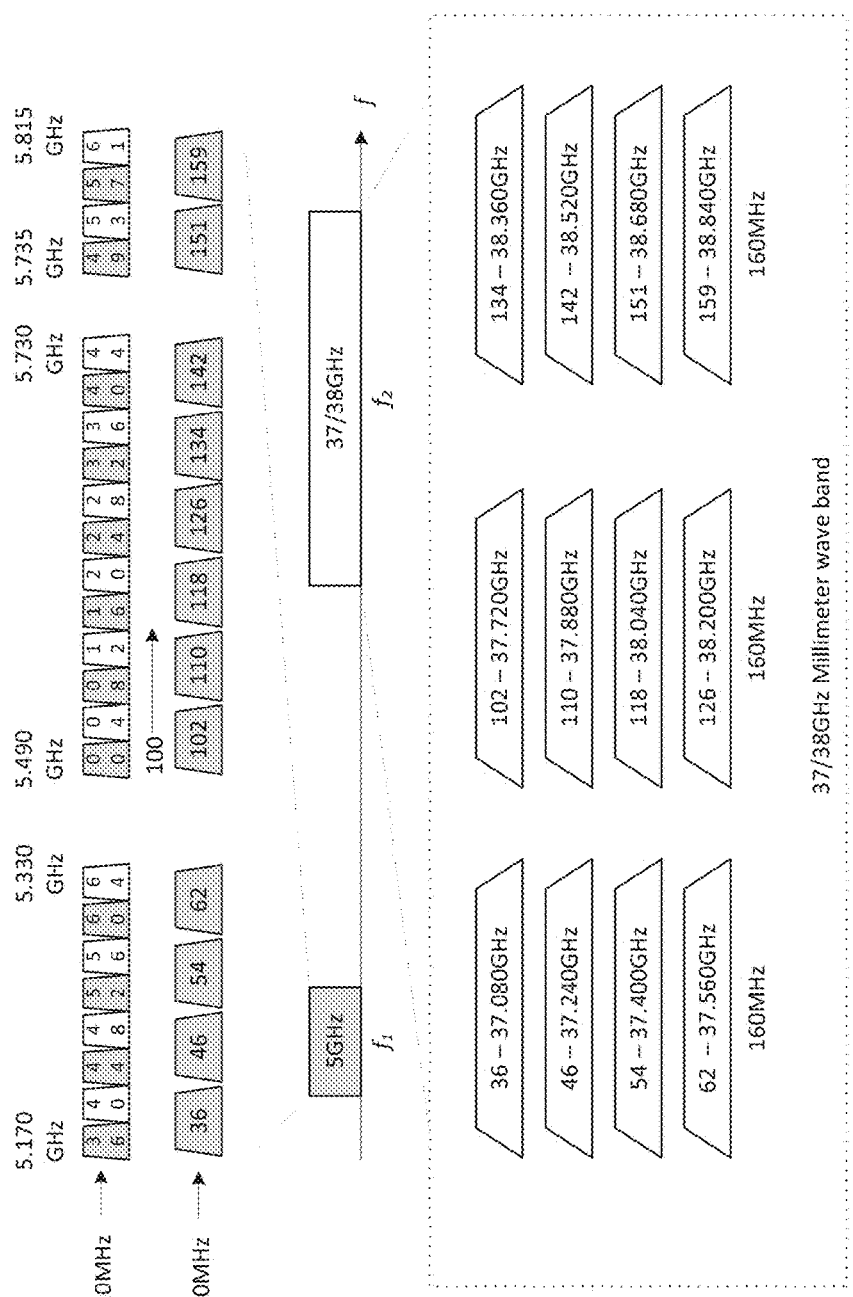

FIG. 11 illustrates 5 GHz unlicensed band channels used in the uplink according to disclosed embodiments. FIG. 12 illustrates an example where unlicensed 5 GHz spectrum and 37/38 GHz bands are used in the receive and transmit directions, respectively, in the wireless communications system in accordance with disclosed embodiments. In the example illustrated in FIG. 11, a maximum bandwidth used at 5 GHz spectrum is 40 MHz. If a maximum bandwidth expansion factor is 4, the maximum bandwidth transmitted at 37/38 GHz band is 160 MHz. By using 12 channels, each of 40 MHz at 5 GHz spectrum, the bandwidth is expanded to 1.92 GHz which is equivalent to 12 channels, each of 160 MHz at 37/38 GHz band.

Figure 13:
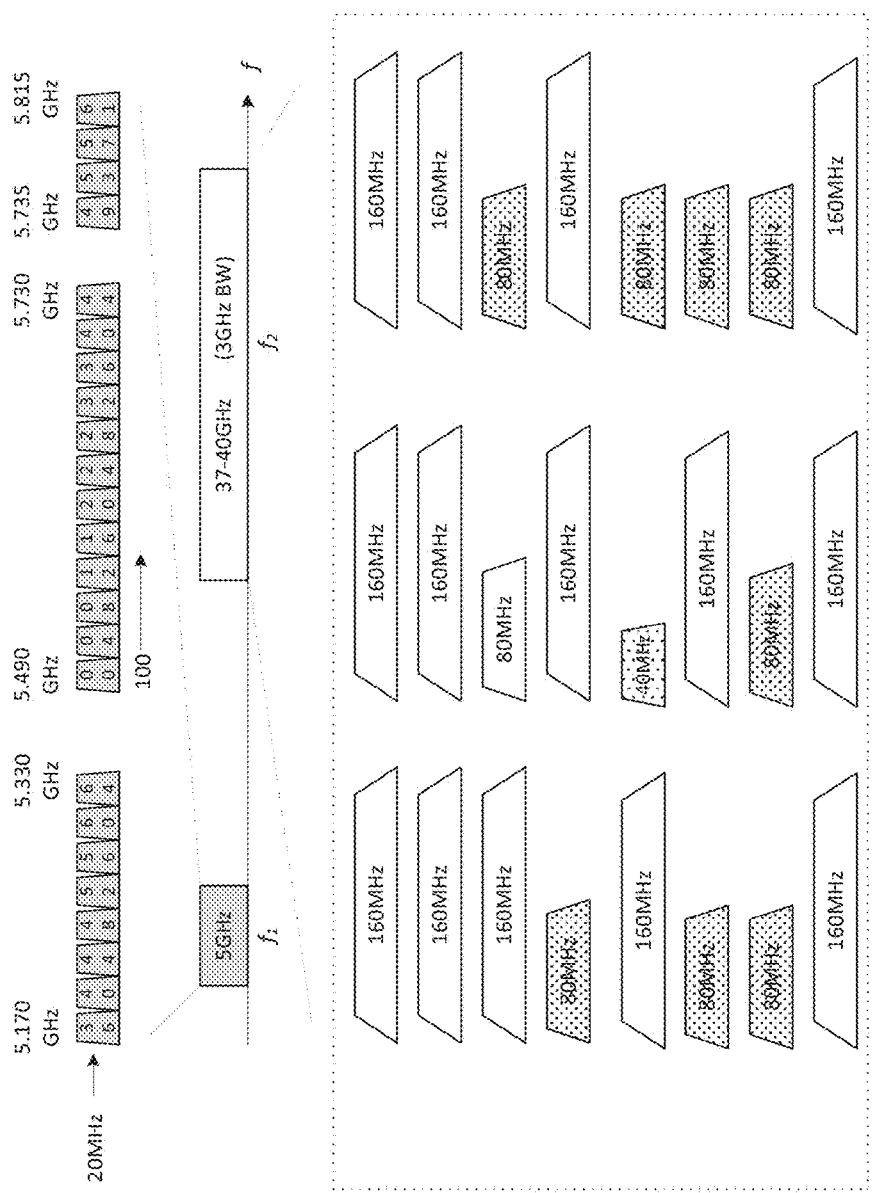

FIG. 13 depicts an example where unlicensed 5 GHz spectrum and 37-40 GHz bands are used in the receive and transmit directions, respectively, in the wireless communications system in accordance with disclosed embodiments. In the example illustrated in FIG. 13, a maximum bandwidth used at 5 GHz spectrum is 20 MHz. If a maximum bandwidth expansion factor is 8, the maximum bandwidth transmitted at 37-40 GHz bands can be 160 MHz. By using 24 channels, each of 20 MHz at 5 GHz spectrum, the bandwidth is expanded to 3.0 GHz which is equivalent to 14 channels of 160 MHz each, 9 channels of 80 MHz and a single channel of 40 MHz at 37-40 GHz bands.

Figure 14:
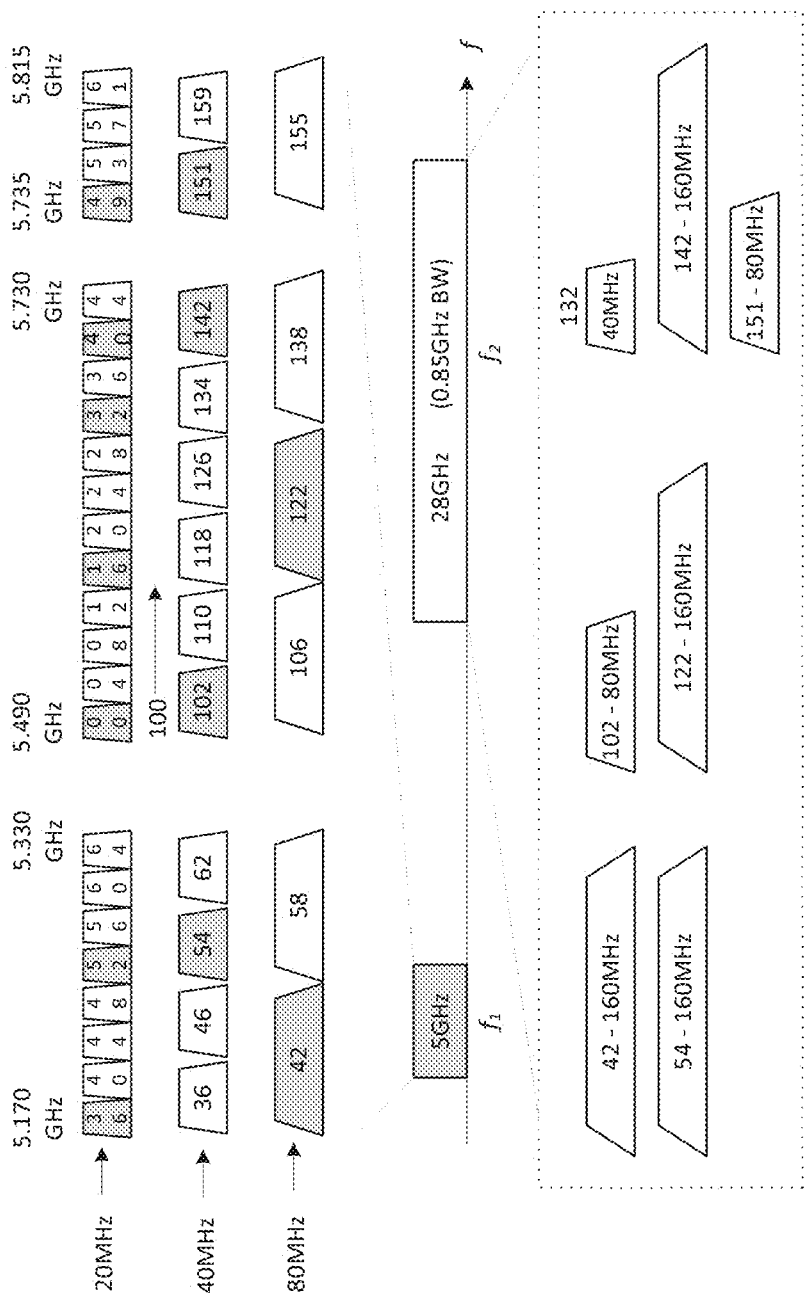

FIG. 14 depicts an example where unlicensed 5 GHz spectrum and 28 GHz bands are used in the receive and transmit directions, respectively. In the example illustrated in FIG. 14, a maximum bandwidth used at 5 GHz spectrum is 80 MHz and different bandwidth expansion factors can be used for different channels.

The channel 42 using 80 MHz bandwidth at 5 GHz is expanded by a factor of 2 to a total bandwidth of 160 MHz at 28 GHz band. The channel 54 using 40 MHz bandwidth at 5 GHz is expanded by a factor of 4 to a total bandwidth of 160 MHz at 28 GHz band. The channel 102 using 40 MHz bandwidth at 5 GHz is expanded by a factor of 2 to a total bandwidth of 80 MHz at 28 GHz band. The channel 122 using 80 MHz bandwidth at 5 GHz is expanded by a factor of 4 to a total bandwidth of 160 MHz at 28 GHz band. The channel 132 using 20 MHz bandwidth at 5 GHz is expanded by a factor of 2 to a total bandwidth of 40 MHz at 28 GHz band. The channel 142 using 40 MHz bandwidth at 5 GHz is expanded by a factor of 4 to a total bandwidth of 160 MHz at 28 GHz band. The channel 151 using 40 MHz bandwidth at 5 GHz is expanded by a factor of 2 to a total bandwidth of 80 MHz at 28 GHz band.

Figure 15:
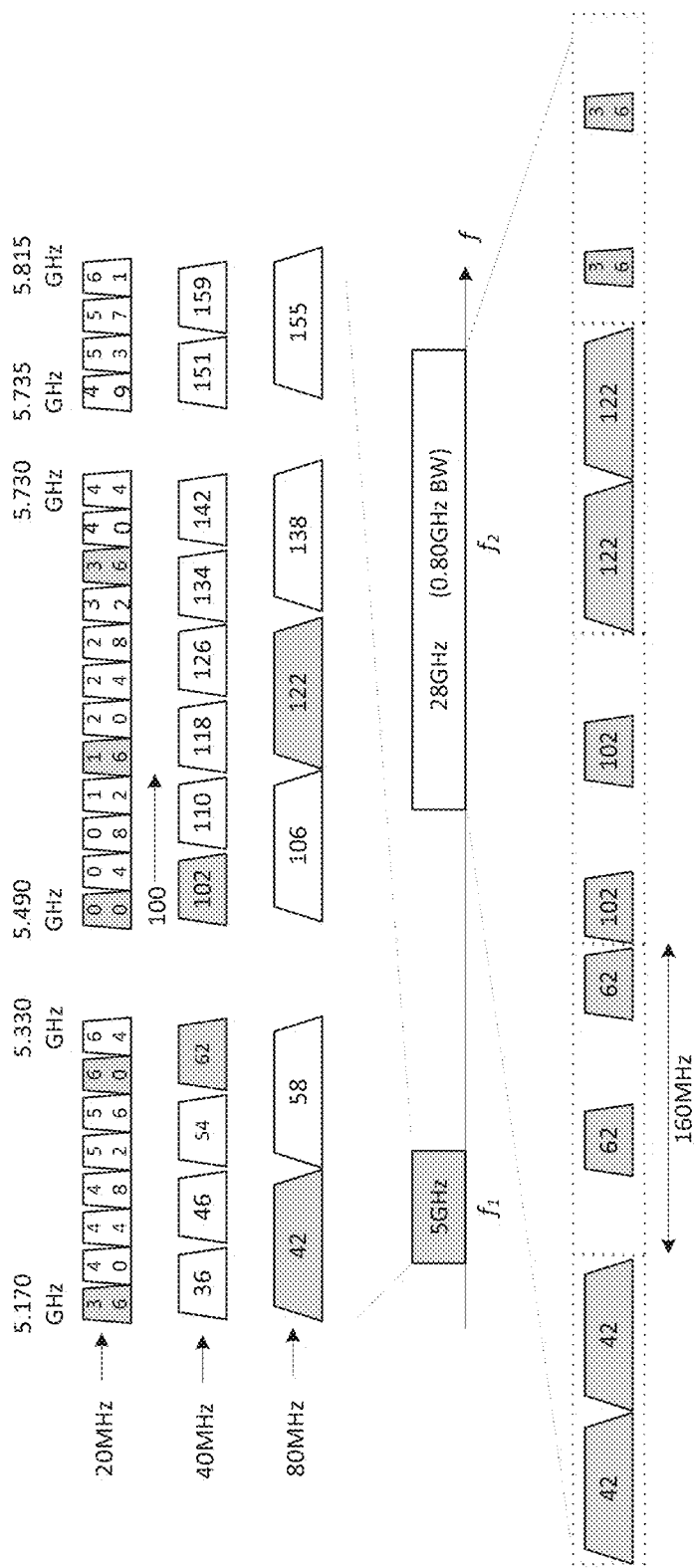

FIG. 15 illustrates an example of channel selection and bandwidth expansion in a wireless communications system in accordance with disclosed embodiments. In particular, FIG. 15 illustrates the case when anchor access point A1 communicates with devices C3, C4 and C5 and non-anchor access points A2 and A3 on a first frequency $f_1$ on the uplink and a second frequency $f_2$ on the downlink. In the example illustrated in FIG. 15, the first frequency in the uplink is 5 GHz unlicensed band and the second frequency in the downlink is 28 GHz band.

Access point A1 allocates primary 20 MHz channel numbers 36, 60, 102, 116 and 136 to communication devices C3, C4 and C5 and non-anchor access points A2 and A3 respectively. Access point A1 also sets the maximum Wi-Fi channel bandwidth to 80 MHz with a bandwidth expansion factor of 2. With a bandwidth expansion factor of 2, the maximum bandwidth allocated to communication devices C3, C4 and C5 and non-anchor access points A2 and A3 is limited to 160 MHz for transmission over the second frequency $f_2$ of 28 GHz. This results in maximum bandwidth utilization of 800 MHz which is equivalent to five 160 MHz channels at the second frequency $f_2$ of 28 GHz.

Access point A1 and the communication device C3 with their primary 20 MHz channel number 36 determines that 80 MHz wide channel number 42 can be used for communication. Using bandwidth expansion principles disclosed in this invention, access point A1 performs a bandwidth expansion by a factor of 2 resulting in total 160 MHZ bandwidth use on the second frequency $f_2$ of 28 GHz.

Access point A1 and the communication device C4 with their primary 20 MHz channel number 60 determines that 40 MHz wide channel number 62 can be used for communication. Using bandwidth expansion principles disclosed herein, access point A1 performs a bandwidth expansion by a factor of 2 resulting in total 80 MHZ bandwidth use on the second frequency $f_2$ of 28 GHz.

Access point A1 and the communication device C3 with their primary 20 MHz channel number 102 determines that 40 MHz wide channel number 106 can be used for communication. Using bandwidth expansion principles disclosed herein, access point A1 performs a bandwidth expansion by a factor of 2 resulting in total 80 MHZ bandwidth use on the second frequency $f_2$ of 28 GHz.

Access point A1 and the non-anchor access point A2 with their primary 20 MHz channel number 116 determines that 80 MHz wide channel number 122 can be used for communication. Access point A1 performs a bandwidth expansion by a factor of 2 resulting in total 160 MHZ bandwidth use on the second frequency $f_2$ of 28 GHz.

Access point A1 and the non-anchor access point A3 with their primary 20 MHz channel number 136 determines that the larger 40 or 80 MHz bandwidth channels are not available. Therefore, primary 20 MHz channel number 136 is used for communication with a bandwidth expansion factor of 2 resulting in total 40 MHz bandwidth use on the second frequency $f_2$ of 28 GHz.

According to disclosed embodiments, the primary 20 MHz channels are selected to minimize the channel overlap between the neighboring access points. FIG. 15 adds channel use in access point A0 in addition to the access point A1. The wireless access point A0 selects primary 20 MHz channel numbers 52, 108 and 140 when it communicates with communication devices C3, C4 and C5 respectively.

Access point A0 and the communication device C0 with their primary 20 MHz channel number 52 determines that 40 MHz wide channel number 54 can be used for communication. Access point A0 performs a bandwidth expansion by a factor of 2 resulting in total 80 MHZ bandwidth use on the second frequency $f_2$ of 28 GHz. Different primary 20 MHz channel selection in the two access points makes the 40 MHz transmissions on channels 54 and 62 non-overlapping reducing interference between these two access points.

Access point A0 and the communication device C1 with their primary 20 MHz channel number 108 determines that 40 MHz wide channel number 110 can be used for communication. Access point A0 performs a bandwidth expansion by a factor of 2 resulting in total 80 MHZ bandwidth use on the second frequency $f_2$ of 28 GHz. Different primary 20 MHz channel selection in the two access points makes the 40 MHz transmissions on channels 102 and 110 non-overlapping reducing interference between these two access points.

Access point A0 and the communication device C2 with their primary 20 MHz channel number 140 determine that the larger 40 or 80 MHz bandwidth channels are not available. Therefore, primary 20 MHz channel number 140 is used for communication with a bandwidth expansion factor of 2 resulting in total 40 MHz bandwidth use on the second frequency $f_2$ of 28 GHz. Different primary 20 MHz channel selection in the two access points makes the 20 MHz transmissions on channels 136 and 140 non-overlapping reducing interference between these two access points.

According to disclosed embodiments, not only the transmissions at 5 GHz are non-overlapping, the expanded transmissions at frequency $f_2$ of 28 GHz are also non-overlapping therefore preserving benefits of non-overlapping primary channel selections after bandwidth expansion.

Figure 16:
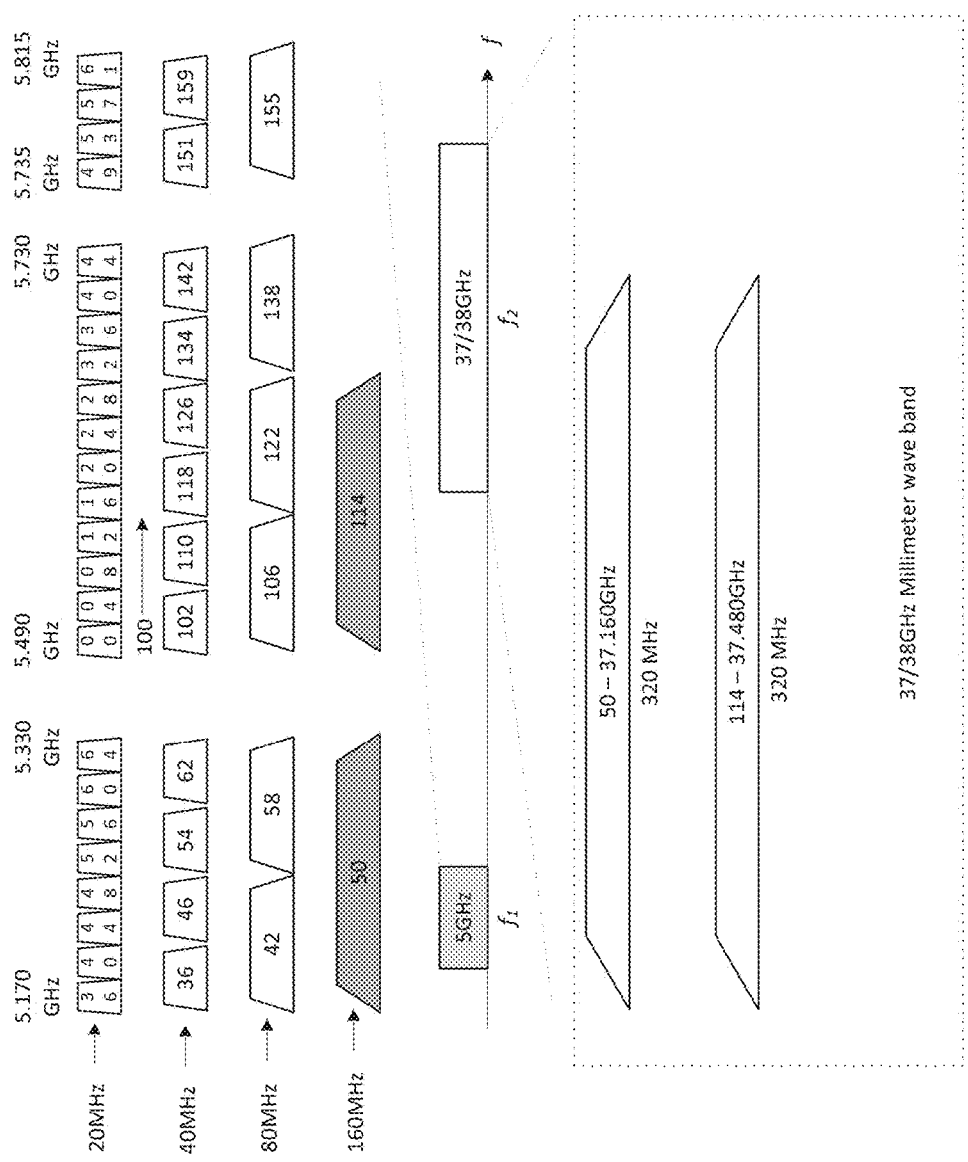

FIG. 16 illustrates an example where unlicensed 5 GHz spectrum and 37/38 GHz bands are used in the uplink and downlink directions, respectively, in the wireless communications system in accordance with disclosed embodiments. In the example illustrated in FIG. 16, a maximum bandwidth used at 5 GHz spectrum is 160 MHz. With a bandwidth expansion factor is 2, the maximum bandwidth transmitted at 37/38 GHz band is 320 MHz. By using 2 channels, channel number 50 and channel number 114, each of 160 MHz at 5 GHz spectrum, the bandwidth is expanded to 640 MHz which is equivalent to 2 channels, each of 320 MHz at 37/38 GHz band.

Figure 17:
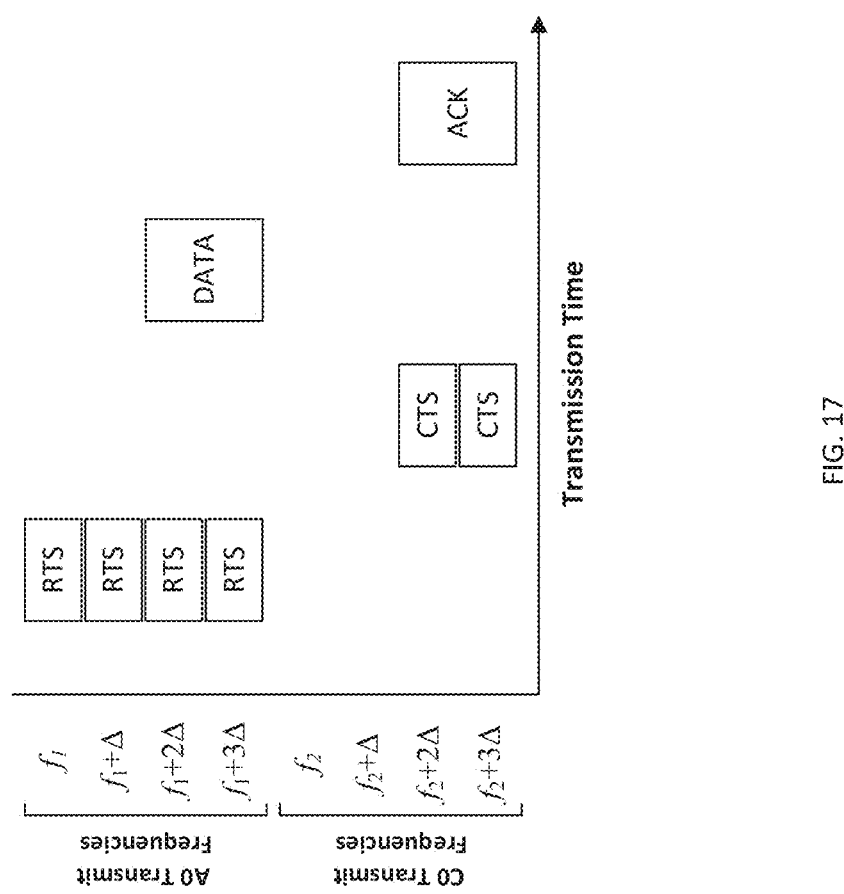
FIG. 17 illustrates dynamic bandwidth selection.

According to disclosed embodiments, the MAC may facilitate dynamic selection of the bandwidth allocation through system metrics, including the contention condition within different segments of the allocated spectrum. FIG. 17 shows an example of dynamic bandwidth selection through request-to-send (RTS) and clear-to-send (CTS) messages for the downlink between access point A0 and communication device C0. a transmitter intends to transmit over a contiguous section of spectrum around frequency $f_1$, split into four even subsections of width $\Delta$. A0 initially sends RTS messages over each $\Delta$-wide spectrum section. If C0 successfully receives an RTS message and determines that the corresponding spectrum section is free from interference, it may respond with a CTS message on the associated uplink spectrum section. In this example, interference was observed on spectrum sections $f_1$ and $f_1+\Delta$, and either the RTS message was not received or future message integrity on these sections could not be guaranteed. C0 responds with CTS messages on uplink spectrum sections $f_2+2\Delta$ and $f_{-2}+3\Delta$, which are associated with the downlink spectrum sections $f_1+2\Delta$ and $f_1+2\Delta$, respectively, for which favorable interference conditions were detected.

When CTS messages are successfully received over these two spectrum sections, A0 responds by transmitting data messages (DATA) over a single 2$\Delta$-wide spectrum section to include individual spectrum sections $f_1+2\Delta$ and $f_1+3\Delta$. If the DATA messages are successfully received by C0, C0 will transmit acknowledgement (ACK) messages over a single 2$\Delta$-wide spectrum section to include individual spectrum sections $f_2+2\Delta$ and $f_2+3\Delta$.

Those skilled in the art will recognize that, for simplicity and clarity, the full structure and operation of all systems suitable for use with the present disclosure is not being depicted or described herein. Instead, only so much of a system as is unique to the present disclosure or necessary for an understanding of the present disclosure is depicted and described. The remainder of the construction and operation of the disclosed systems may conform to any of the various current implementations and practices known in the art.

Of course, those of skill in the art will recognize that, unless specifically indicated or required by the sequence of operations, certain steps in the processes described above may be omitted, performed concurrently or sequentially, or performed in a different order. Further, no component, element, or process should be considered essential to any specific claimed embodiment, and each of the components, elements, or processes can be combined in still other embodiments.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

The invention claimed is:

1. A wireless access point configured to communicate in millimeter wave frequency bands in the downlink direction and in sub-6 GHz frequency bands in the uplink direction, comprising:
   a multiple input multiple output (MIMO) transmit antenna array configured to operate in the millimeter wave frequency bands;
   a multiple input multiple output (MIMO) receive antenna array configured to operate in the sub-6 GHz frequency bands;
   a signal processing circuit configured to generate a plurality of transmit signals of different spatial streams;
   a frequency shift circuit configured to apply different frequency shifts to transmit signals of different spatial streams; and
   a mixer driven by a local oscillator, the mixer configured to up-convert the frequency shifted signals to millimeter wave frequency band signals,
   wherein the millimeter wave frequency band signals are transmitted by the MIMO transmit antenna array, and wherein zero frequency-shift is applied to signals received by the MIMO receiver antenna array.

2. The wireless access point of claim 1, further comprising a plurality of power amplifiers configured to amplify the millimeter wave frequency band signals prior to transmission by the MIMO transmit antenna array.

3. The wireless access point of claim 1, further comprising a plurality of phase shifters configured to apply phase shifts to the up-converted millimeter wave frequency band signals.

4. The wireless access point of claim 1, wherein the millimeter wave frequency bands are greater than 20 GHz.

5. The wireless access point of claim 1, wherein the sub-6 GHz frequency bands are Wi-Fi bands.

6. The wireless access point of claim 1, wherein the sub-6 GHz frequency bands are Fourth Generation (4G) Long Term Evolution (LTE) bands.

7. The wireless access point of claim 1, further comprising a signal combiner configured to combine the frequency shifted signals prior to up-conversion.

8. The wireless access point of claim 1, wherein the frequency shift is applied by using frequency shifted values for the local oscillator during up-conversion.

9. A wireless communication device, comprising:
   a multiple input multiple output (MIMO) transmit antenna array configured to transmit sub-6 GHz band uplink signals;
   a multiple input multiple output (MIMO) receive antenna array configured to receive millimeter wave frequency band downlink signals of different spatial streams;
   a mixer driven by a local oscillator, the mixer configured to down-convert the millimeter wave frequency band downlink signals of different spatial streams;
   a frequency shift circuit configured to apply different frequency shifts to the down-converted signals of different spatial streams; and
   a signal processing circuit configured to process the down converted signals,
   wherein zero frequency shift is applied to the sub-6 GHz uplink signals, wherein the millimeter wave band downlink signals are separated from the sub-6 GHz band uplink signals by at least 10 GHz.

10. The wireless communication device of claim 9, wherein the millimeter wave band is greater than 20 GHz.

11. The wireless communication device of claim 9, further comprising a signal combiner configured to combine the down-converted signals prior to applying the frequency shifts.

12. The wireless communication device of claim 9, wherein the frequency shift is applied by using frequency shifted values for the local oscillator during down-conversion.

13. A wireless access point configured to communicate in millimeter wave frequency bands in the downlink direction and in sub-6 GHz frequency bands in the uplink direction, comprising:
- a multiple input multiple output (MIMO) transmit antenna array configured to operate in the millimeter wave frequency bands;
- a multiple input multiple output (MIMO) receive antenna array configured to operate in the sub-6 GHz frequency bands;
- a signal processing circuit configured to generate a plurality of transmit signals of different spatial streams;
- a frequency shift circuit configured to apply frequency shifts to a first group of the transmit signals of different spatial streams, wherein no frequency shifts are applied to a second group of the transmit signals of different spatial streams; and
- a mixer driven by a local oscillator, the mixer configured to up-convert the first and second group of transmit signals to millimeter wave frequency band signals; and
- a signal combiner configured to combine the frequency shifted first group of the transmit signals and the second group of the transmit signals,
- wherein the millimeter wave frequency band signals are transmitted by the MIMO transmit antenna array.

14. The wireless access point of claim 13, wherein the frequency shift circuit applies different frequency shifts to the first group of the transmit signals.

15. The wireless access point of claim 13, further comprising a plurality of power amplifiers configured to amplify the millimeter wave frequency band signals prior to transmission by the MIMO transmit antenna array.

16. The wireless access point of claim 13, wherein the millimeter wave frequency bands are greater than 20 GHz.

17. The wireless access point of claim 13, wherein the frequency shift is applied by using frequency shifted values for the local oscillator during up-conversion.

18. A wireless communication device, comprising:
- a multiple input multiple output (MIMO) transmit antenna array configured to transmit sub-6 GHz band uplink signals;
- a multiple input multiple output (MIMO) receive antenna array configured to receive millimeter wave frequency band downlink signals of different spatial streams;
- a mixer driven by a local oscillator, the mixer configured to down-convert the millimeter wave frequency band downlink signals of different spatial streams;
- a frequency shift circuit configured to apply different inverse frequency shifts to the down-converted signals of different spatial streams, wherein the different inverse frequency shifts negate the frequency shifts applied to the millimeter wave frequency band downlink signals prior to reception by the MIMO receive antenna array; and
- a signal processing circuit configured to process the down converted signals,
- wherein zero frequency shift is applied to the sub-6 GHz band uplink signals, and wherein the millimeter wave band downlink signals are separated from the sub-6 GHz band uplink signals by at least 10 GHz.

19. The wireless communication device of claim 18, wherein the millimeter wave band is greater than 20 GHz.

20. The wireless communication device of claim 18, wherein the frequency shift is applied by using frequency shifted values for the local oscillator during down-conversion.

* * * * *